United States Patent

Lin

(10) Patent No.: US 9,476,711 B2
(45) Date of Patent: *Oct. 25, 2016

(54) ANGULAR RATE SENSOR WITH QUADRATURE ERROR COMPENSATION

(71) Applicant: FREESCALE SEMICONDUCTOR, INC., Austin, TX (US)

(72) Inventor: Yizhen Lin, Cohoes, NY (US)

(73) Assignee: Freescale Semiconductor, Inc., Austin, TX (US)

( * ) Notice: Subject to any disclaimer, the term of this patent is extended or adjusted under 35 U.S.C. 154(b) by 331 days.

This patent is subject to a terminal disclaimer.

(21) Appl. No.: 13/924,880

(22) Filed: Jun. 24, 2013

(65) Prior Publication Data

US 2014/0374849 A1 Dec. 25, 2014

(51) Int. Cl.
| G01C 19/5762 | (2012.01) |
| G01C 19/5712 | (2012.01) |
| G01C 19/5726 | (2012.01) |
| G01C 19/574 | (2012.01) |
| G01C 19/5747 | (2012.01) |

(52) U.S. Cl.
CPC ......... G01C 19/5712 (2013.01); G01C 19/574 (2013.01); G01C 19/5726 (2013.01); G01C 19/5747 (2013.01); G01C 19/5762 (2013.01)

(58) Field of Classification Search
CPC .......... G01C 19/5705; G01C 19/5747; G01C 19/5762
See application file for complete search history.

(56) References Cited

U.S. PATENT DOCUMENTS

| 4,511,848 | A | | 4/1985 | Watson | |
| 5,635,638 | A | * | 6/1997 | Geen | 73/504.04 |
| 5,992,233 | A | * | 11/1999 | Clark | 73/514.35 |
| 6,067,858 | A | | 5/2000 | Clark et al. | |
| 6,370,937 | B2 | * | 4/2002 | Hsu | G01P 9/04 73/1.37 |
| 6,997,054 | B2 | * | 2/2006 | Tsugai | G01P 15/125 73/504.12 |
| 7,481,110 | B2 | | 1/2009 | Handrich et al. | |
| 2003/0180504 | A1 | * | 9/2003 | Yoshida | G01C 19/5755 428/172 |
| 2004/0149035 | A1 | * | 8/2004 | Acar | B81B 3/0062 73/504.12 |
| 2008/0282833 | A1 | | 11/2008 | Chaumet | |
| 2010/0154541 | A1 | * | 6/2010 | Cazzaniga | G01C 19/5712 73/504.12 |
| 2010/0281977 | A1 | * | 11/2010 | Coronato et al. | 73/504.14 |
| 2011/0041609 | A1 | | 2/2011 | Clark et al. | |

* cited by examiner

*Primary Examiner* — Robert Huber
*Assistant Examiner* — Herbert K Roberts
(74) *Attorney, Agent, or Firm* — Charlene R. Jacobsen

(57) ABSTRACT

An angular rate sensor includes a substrate, a drive mass flexibly coupled to the substrate, and a sense mass suspended above the substrate and flexibly coupled to the drive mass via flexible support elements. An electrode structure is mechanically coupled to, but electrically isolated from, the drive mass and is spaced apart from the substrate so that it is not in contact with the substrate. The electrode structure is configured to produce a signal that indicates movement of the sense mass relative to the electrode when the sensor is subjected to angular velocity. When the angular rate sensor experiences quadrature error, the drive mass, the sense mass, and the electrode structure move together relative to the sense axis. Since the sense mass and the electrode structure move together in response to quadrature error, there is little relative motion between the sense mass and the electrode structure so that quadrature error is largely eliminated.

8 Claims, 4 Drawing Sheets

ANGULAR RATE SENSOR WITH QUADRATURE ERROR COMPENSATION

TECHNICAL FIELD OF THE INVENTION

Embodiments of the present invention relate generally to microelectromechanical systems (MEMS) devices. More specifically, embodiments of the present invention relate to MEMS angular rate sensors with compensation for quadrature error.

BACKGROUND OF THE INVENTION

Microelectromechanical systems (MEMS) technology has achieved wide popularity in recent years, as it provides a way to make very small mechanical structures and integrate these structures with electrical devices on a single substrate using conventional batch semiconductor processing techniques. One common application of MEMS is the design and manufacture of sensor devices. MEMS sensors are widely used in applications such as automotive, inertial guidance systems, household appliances, game devices, protection systems for a variety of devices, and many other industrial, scientific, and engineering systems. One example of a MEMS sensor is a MEMS angular rate sensor. Alternatively referred to as a "gyroscope", "gyrometer," "vibratory rate gyroscopes," "gyroscope sensor," or "yaw rate sensor," an angular rate sensor senses angular speed or velocity around one or more axes.

BRIEF DESCRIPTION OF THE DRAWINGS

A more complete understanding of embodiments of the present invention may be derived by referring to the detailed description and claims when considered in connection with the Figures, wherein like reference numbers refer to similar items throughout the Figures, and:

DETAILED DESCRIPTION

In vibratory angular rate sensors, an inherent problem is the existence of undesirable interference signals, referred to as a quadrature component or quadrature error. Quadrature error occurs in vibrating angular rate sensors due to manufacturing imperfections that permit the sense mass to oscillate about an axis that is not orthogonal to the sense axis. This creates an oscillation about the sense axis that can be confused with Coriolis acceleration and subsequently, the rotation rate. Unfortunately, quadrature error can result in offset error, reduced dynamic range, and increased noise for the device. A large quadrature error can even cause a device to rail so that the sense mass comes into contact with conductive electrodes potentially resulting in collision-related damage, such as a short.

In some devices, an electrostatic force may be applied via quadrature compensation electrodes in opposite phase relation to the quadrature error in order to compensate for, or otherwise null, the quadrature signal. While application of an electrostatic force can suppress mechanical motion caused by quadrature error, this technique requires relatively large voltage, large allocated area for quadrature compensation electrodes, and/or precise phase matching between the quadrature error and the electrostatic compensation force. In other devices, a cancellation signal may be applied onto the front end of the application-specific integrated circuit (ASIC) to null out the quadrature signal. Such a technique can cancel large quadrature error without application of an electrostatic force. However, mechanical quadrature motion still exists, and a precise match must be made between the quadrature error signal and the cancellation signal in order to effectively null the quadrature error.

Embodiments disclosed herein include microelectromechanical systems (MEMS) devices in the form of angular rate sensors in which a quadrature compensation technique is implemented. It has been determined that when an angular rate sensor experiences quadrature motion, both the drive mass and the sense mass move together in response to this quadrature motion. In accordance with embodiments disclosed herein, sense electrodes are mechanically attached to the drive mass. Therefore, the drive mass, sense mass, and sense electrodes will move together in response to quadrature motion. Since the drive mass, sense mass, and sense electrodes move together, the capacitance output due to quadrature error will be significantly reduced, thus compensating for the quadrature error. Consequently, compensation for quadrature error is accomplished without using electrostatic force.

Figure 1:
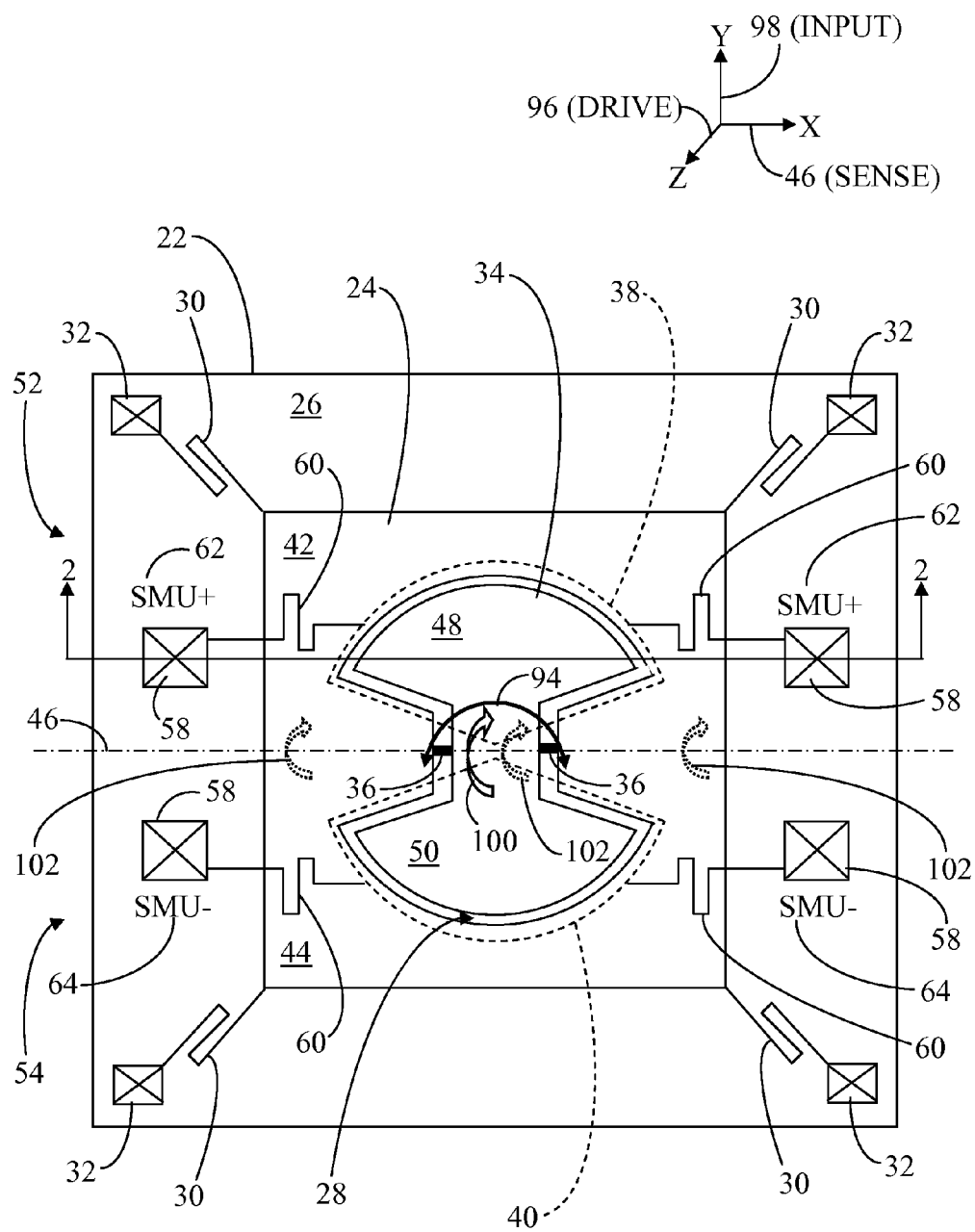
FIG. 1 shows a top view diagram of an angular rate sensor in accordance with an embodiment.
Figure 2:
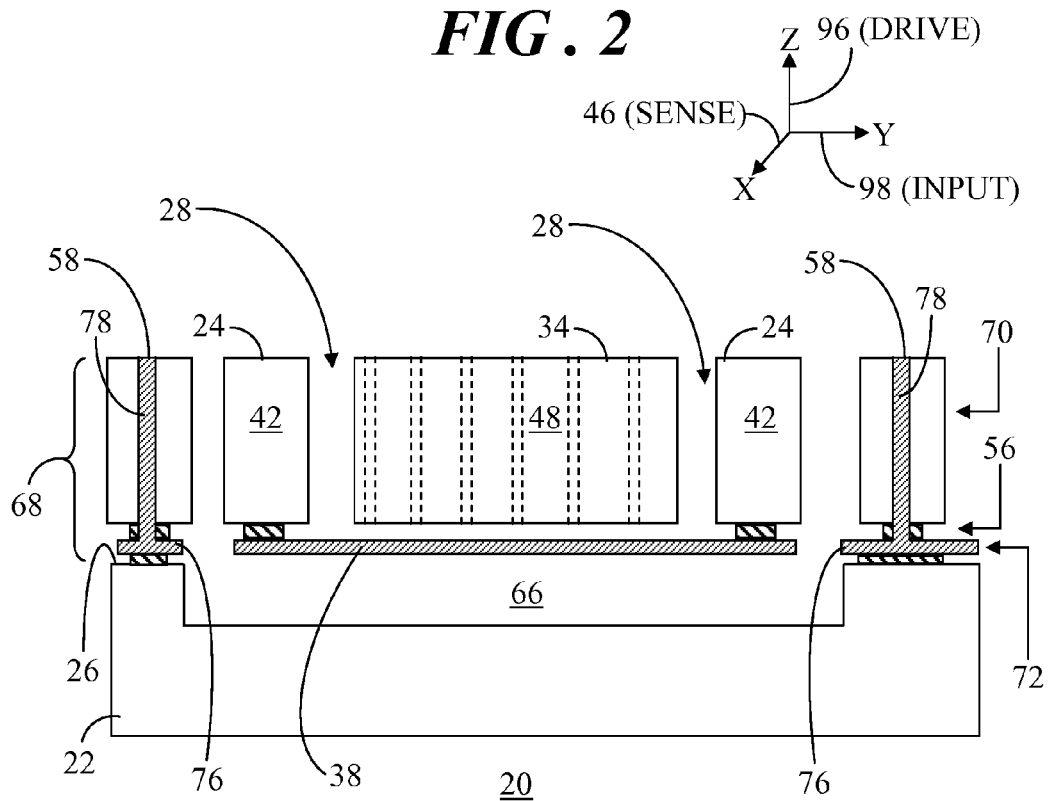
FIG. 2 shows a side view diagram of the angular rate sensor along section line 2-2 in FIG. 1.

Referring to FIGS. 1 and 2, FIG. 1 shows a top view diagram of a MEMS angular rate sensor 20 in accordance with an embodiment, and FIG. 2 shows a side view diagram of angular rate sensor 20 along section line 2-2 in FIG. 1. FIG. 2 is illustrated using various shading and/or hatching to more clearly distinguish different elements produced within the structural layers of angular rate sensor 20. The different elements within the structural layers of angular rate sensor 20 may be produced utilizing current and upcoming surface micromachining techniques of depositing, patterning, etching, and so forth. Accordingly, although different shading and/or hatching is utilized in the illustrations, the different elements and interconnects within the structural layers may be formed out of the same material, such as polysilicon, single crystal silicon, and the like.

The elements of angular rate sensor 20 (discussed below) may be described variously as being "attached to," "attached with," "coupled to," "fixed to," or "interconnected with," other elements of angular rate sensor 20. However, it should be understood that the terms refer to the direct or indirect physical connections of particular elements of MEMS angular rate sensor 20 that occur during their formation through patterning and etching processes of MEMS fabrication.

Angular rate sensor 20 includes a substrate 22 and a drive mass 24 suspended above a surface 26 of substrate 22. In some embodiments, drive mass 24 is flexibly attached with flexible support elements 30, e.g., springs, to surface 26 of substrate 22 via anchors 32. Angular rate sensor 20 further includes a sense mass 34 residing in a central opening 28 extending through drive mass 24. Sense mass 34 is attached to drive mass 24 via flexible support elements, i.e., torsion flexures 36, so that sense mass 34 is also suspended above substrate 22.

Angular rate sensor 20 further includes an electrode structure coupled to drive mass 28. In some embodiments, the electrode structure includes a first sense plate 38 and a second sense plate 40, each of which are coupled to drive mass 28 so that they are spaced apart from and not in contact with substrate 22. In some embodiments, drive mass 24 and sense mass 34 overlie first and second sense plates 38 and 40 so that first and second sense plates 38 and 40 are disposed between masses 24 and 34 and surface 26 of substrate 22. Consequently, first and second sense plates 38 and 40 are obscured in the top view of sensor 20, and are thus represented in dashed line form in FIG. 1. However, first sense plate 38 is visible in the side view representation of angular rate sensor 20 in FIG. 2.

In an illustrative embodiment, drive mass 24 includes a first region 42 and a second region 44 delineated, or separated, by an axis of rotation 46 that is oriented parallel to surface 26 of substrate 22. Similarly, sense mass 34 includes a third region 48 and a fourth region 50 delineated, or separated, by axis of rotation 46. First region 42 of drive mass 24 and third region 48 of sense mass 34 are laterally disposed on a first side 52 of axis of rotation 46 and second region 44 of drive mass 24 and fourth region 50 of sense mass 34 are laterally disposed on a second side 54 of axis of rotation 46. In an embodiment, first sense plate 38 is fixedly attached (i.e., coupled to) to first region 42 of drive mass 24 about a perimeter of central opening 28 and extends across at least a portion of central opening 28 underlying third region 48 of sense mass 34. This structural configuration is best visualized in FIG. 2. Likewise, second sense plate 40 is fixedly attached to second region 44 about a perimeter of central opening 28 and extends across at least a portion of central opening underlying fourth region 50 of sense mass 34.

Although first and second sense plates 38 and 40 are fixedly attached to drive mass 24, first and second sense plates 38 and 40 are electrically isolated from drive mass 24. This electrical isolation may be achieved by the surface micromachining processes of deposition, patterning, and etching so that an insulating layer 56 of a nonconductive material, such as, an oxide, is interposed between sense electrodes 38 and 40 and drive mass 24. However, first and second sense plates 38 and 40 may be electrically connected to stationary electrodes 58 via springs 60 so that sense signals 62 and 64, labeled SMU+ and SMU− in FIG. 1, may be output from first and second sense electrodes 38 and 40.

Referring to the side view diagram of FIG. 2, in some embodiments, substrate 22 includes a cavity 66 extending inwardly from surface 26 of substrate 22. Drive mass 24 and sense mass 34 are suspended above cavity 66, and first and second sense plates 38 and 40 are interposed between cavity 66 and drive and sense masses 24 and 34, respectively.

General process flow for fabricating MEMS angular rate sensor 20 having cavity 66 entails forming cavity 66 in substrate 22 using an etch process and bonding a second substrate 68 to substrate 22 with cavity 66 interposed between them. In an embodiment, second substrate 68 may include a relatively thick silicon base layer 70, a relatively thin polysilicon layer 72, and insulating layer 56 interposed between layers 70 and 72. Insulating layer 56 may include glass, silicon dioxide, silicon nitride, or any other compatible material. In an embodiment, insulating layer 56 is an oxide layer, and will thus be referred to hereinafter as oxide layer 56. Prior to bonding, the relatively thin polysilicon layer 72 may be suitably patterned and etched to form first and second sense electrodes 38 and 40, electrode pads 76, and springs 60. Following bonding, first and second sense electrodes 38 and 40 are thus interposed between substrate 22 and silicon base layer 70 of second substrate 68.

Further process steps may entail fabrication operations performed on second substrate 68 including, for example, etch and fill operations through oxide layer 56 and silicon base layer 70 to form conductive filled vias 78 that form electrical connections to electrode pads 76. Next, an etch process, such as deep reactive ion etching (DRIE), may be performed to form drive mass 24, central opening 28, sense mass 34, and flexible support elements 30 and 36 in silicon base layer 70. It should be observed that DRIE may be used to form small openings extending through sense mass 34. These small openings are shown in dashed line form extending through sense mass 34.

An oxide time etch, such as by vapor phase etch (VPE), may then be performed to remove a portion of oxide layer 56 that may be located between sense mass 34 and the underlying sense electrodes 38 and 40. Methodology may entail passing the etchant through the small openings extending through sense mass 34, as well as through central opening 28 surrounding sense mass 34. Sense mass 34 is thus released so that it can oscillate about axis of rotation 46 via torsion flexures 36 in response to angular rate, as will be discussed below. First and second sense plates 38 and 40, which are fixedly attached to drive mass 24, can thus produce a signal that indicates movement of sense mass 34 in response to angular rate relative to sense plates 38 and 40.

Figure 3:
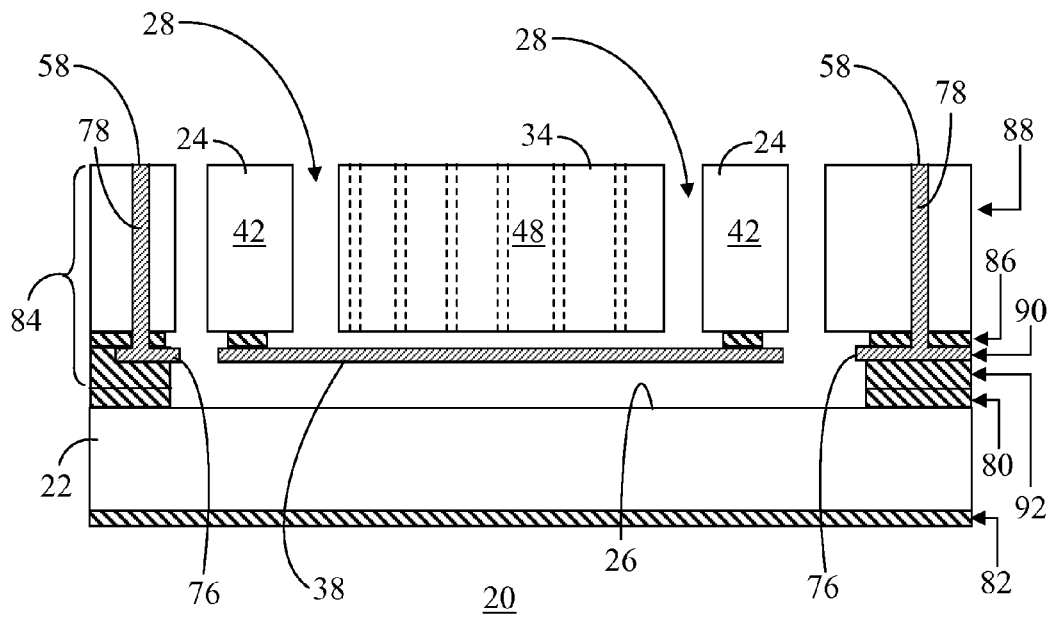
FIG. 3 shows a side view diagram of the angular rate sensor along section line 2-2 of FIG. 1 in accordance with another embodiment.

Referring now to FIG. 3 in connection with FIG. 1, FIG. 3 shows a side view diagram of angular rate sensor 20 along section line 2-2 of FIG. 1 in accordance with another embodiment. In the illustrative embodiment of FIG. 3, substrate 22 does not have a cavity formed therein. General process flow for fabricating MEMS angular rate sensor 20 that does not have a cavity formed in substrate 22 entails forming substrate 22 with double sided insulating material, e.g., oxide. Accordingly, in FIG. 3, substrate 22 is suitably formed to include a first oxide layer 80 and a second oxide layer 82. Process operations performed on a second substrate 84 entail oxide deposition and via etch to form an insulating oxide layer 86 on a silicon base layer 88, polysilicon deposition and patterning over oxide layer 86 to form a polysilicon layer 90 that includes first and second sense plates 38 and 40, electrode pads 76, and so forth as discussed. Further process operations entail oxide deposition, chemical mechanical planarization, and oxide patterning to form another insulating oxide layer 92 overlying polysilicon layer 90. Portions of insulating oxide layer 92 under first and second sense electrodes 38 and 40 may be selectively etched away. Following etching of oxide layer 92, second substrate 84 is then bonded to substrate 22. Following bonding, first and second sense electrodes 38 and 40 are thus interposed between substrate 22 and oxide layer 86 of second substrate 84.

Further process steps may entail fabrication operations performed on second substrate 84 including, for example, etch and fill operations to form conductive filled vias 78, DRIE to form drive mass 24, central opening 28, sense mass 34, and flexible support elements 30 and 36 in silicon base layer 88, and an oxide time etch to remove a portion of oxide layers 86 and 80. The space created by etching oxide layers 86, 92, 80 results in drive mass 24, sense mass 34, an sense plates 38 and 40 being suspended above surface 26 of substrate 22. Sense mass 34 is thus released so that it can oscillate about axis of rotation 46 via torsion flexures 36 in response to angular rate, as will be discussed below.

With reference back to FIG. 1, to operate angular rate sensor 20, a drive system (not shown for simplicity of illustration) in communication with drive mass 24 enables mechanical oscillation, as represented by a bi-directional arrow 94, of drive mass 36 in a plane parallel to surface 26 of substrate 22 about an axis of rotation, referred to herein as a drive axis 96. As such, drive axis 96 is perpendicular to surface 26. In this example, drive axis 96 is the Z-axis in a three-dimensional coordinate system. Sense mass 34 oscillates about drive axis 96 together with drive mass 24 due to the high stiffness of torsion flexures 36 to this motion. The oscillatory drive motion 94 may be kept constant to maintain constant sensitivity of angular rate sensor 20. Additionally or alternatively, the frequency of oscillation can be locked to the mechanical resonance of drive mass 24 to minimize drive power.

Once sense mass 34 is put into oscillatory motion 94 about drive axis 96, it is capable of detecting an angular rate, i.e., angular velocity, induced by angular rate sensor 20 being rotated about a second axis of rotation, referred to herein as an input axis. In this example, the input axis is the Y-axis 98 in a three-dimensional coordinate system. Thus, Y-axis 98 is referred to herein as an input axis 98 in connection with angular rate sensor 20. As angular rate sensor 20 experiences an angular velocity about input axis 98, sense mass 34 oscillates about a third axis of rotation, referred to herein as a sense axis. In this example, the sense axis is axis of rotation 46, which is also the X-axis in a three-dimensional coordinate system. Thus, thus axis of rotation 46 is referred to hereinafter as sense axis 46 in connection with angular rate sensor 20. In particular, a Coriolis acceleration occurs about sense axis 46, which is perpendicular to both drive axis 96, and input axis 98. The Coriolis acceleration results in out-of-plane movement of sense mass 34 about sense axis 46, as represented by solid arrow 100, where the out-of-plane movement 100 has an amplitude that is proportional to the angular rotation rate of sensor 20 about input axis 98.

In general, as sense mass 34 undergoes the oscillatory out-of-plane movement 100 about sense axis 46, the position change is sensed as changes in capacitance by first and second sense plates 38 and 40, which do not undergo oscillatory out-of-plane movement 100 due to their fixed attachment to drive mass 24. The change in capacitance sensed at first and second sense plates 38 and 40 is processed electronically in the conventional manner to obtain the angular rate of angular rate sensor 20 about input axis 98.

It should be recalled that drive mass 24 and sense mass 34 can move together about sense axis 46 in response to quadrature error. The motion of both drive mass 24 and sense mass 34 due to quadrature error is represented by arrows 102. If left uncompensated, this quadrature error can produce signal error components. However, since first and second sense plates 38 and 40 are attached to drive mass 24, first and second sense plates 38 and 40 move together with both drive mass 24 and sense mass 34 in response to motion due to quadrature error. Accordingly, there is no or little relative motion between sense mass 34 and first and second sense plates 38 and 40 about sense axis 46 so that no, or a significantly reduced, signal error component is output. Therefore, quadrature error is largely eliminated from sense signals 62 and 64 so that quadrature error compensation is achieved.

Angular rate sensor 20 is provided with only two pairs of conductive plates (e.g., first and second sense plates 38 and 40) for simplicity of illustration. It should be understood, however, that in alternative embodiments, additional electrode shapes, sizes, and types may be implemented for a particular design, provided that the sense electrodes are suspended apart from the underlying substrate and are coupled to the drive mass. In addition, in alternative embodiments, the drive mass and/or sense mass can have different shapes, such as circular rings, disks, and the like, then that which is shown.

Figure 4:
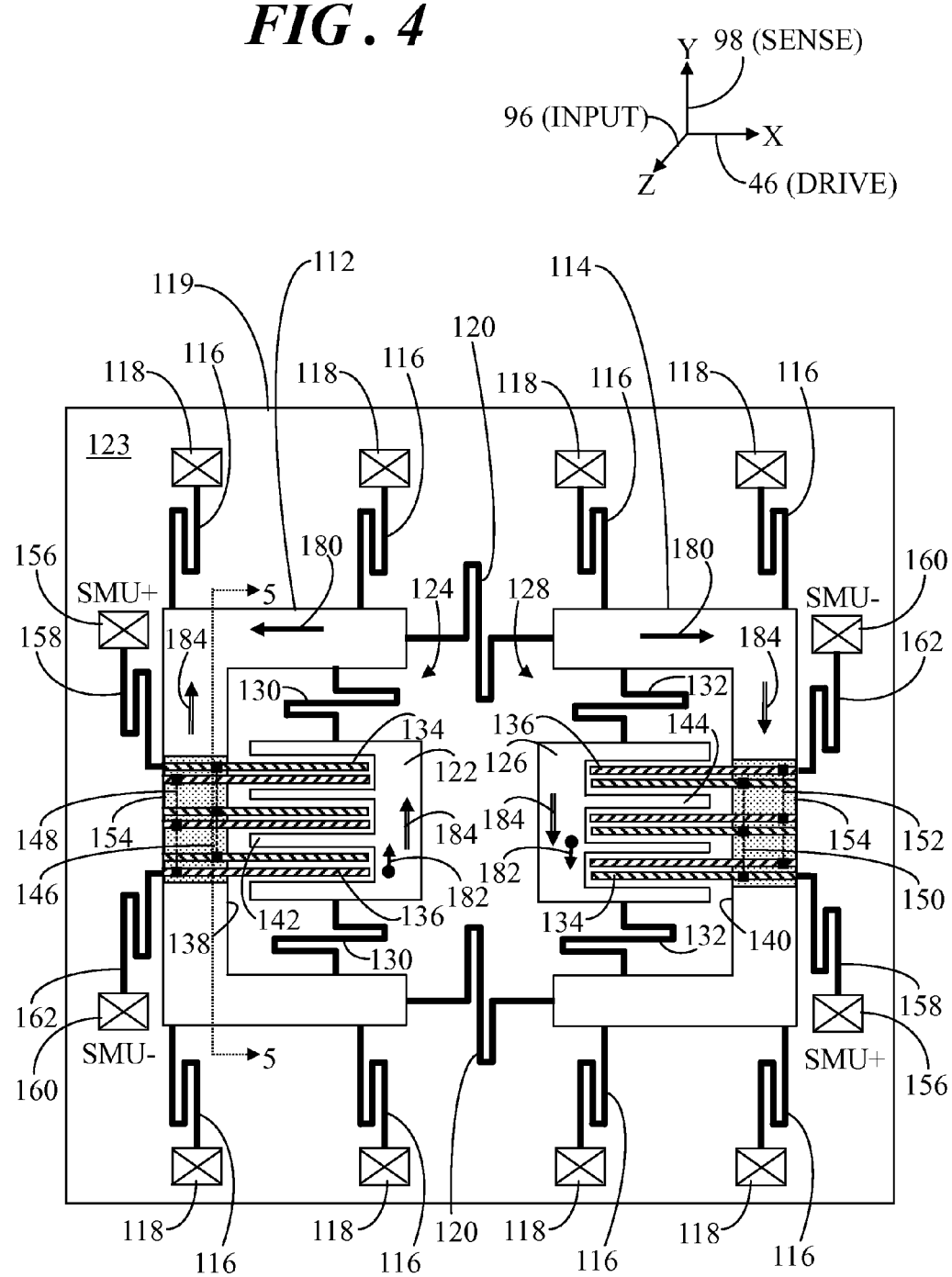
FIG. 4 shows a top view diagram of an angular rate sensor in accordance with another embodiment.
Figure 5:
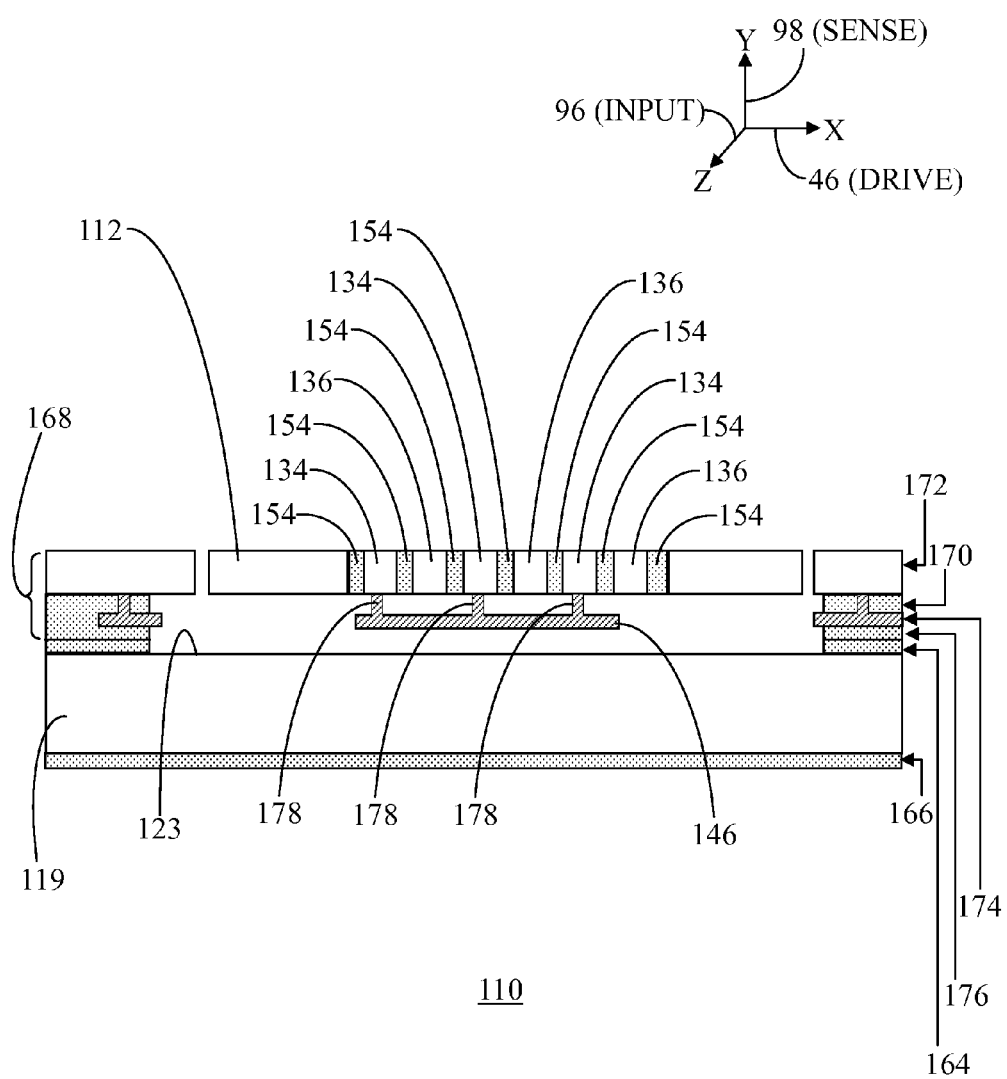
FIG. 5 shows a side view diagram of the angular rate sensor along section line 5-5 of FIG. 4.

Referring to FIGS. 4 and 5, FIG. 4 shows a top view diagram of an angular rate sensor 110 in accordance with another embodiment, and FIG. 5 shows a side view diagram of angular rate sensor 110 along section line 5-5 of FIG. 4. Angular rate sensor 110 exemplifies the quadrature compensation technique in a single axis sensor configured to sense angular rate about Z-axis 96. Thus, Z-axis 96 is referred to in connection with angular rate sensor 110 as an input axis 96. Various elements of angular rate sensor 110 are illustrated with shading or hatching in order to better distinguish them from one another. In accordance with conventional manufacturing techniques, the various elements may be formed concurrently through deposition, patterning, and etching processes, and thus are likely to be manufactured from the same material such as polysilicon.

Angular rate sensor 110 includes a split drive mass system, in the form of a first drive mass 112 and a second drive mass 114 laterally disposed away from first drive mass 112. First and second drive masses 112 and 114 are flexibly attached with flexible support elements 116, e.g. springs, via anchors 118 to substrate 119 so that they are suspended above a surface 123 of a substrate 119. Additionally, first and second drive masses 112 and 114 may be coupled to one another via flexible elements 120.

Angular rate sensor 110 further includes a first sense mass 122 residing in an opening 124, or notched section, extending through first drive mass 112 and a second sense mass 126 residing in an opening 128, or notched section, extending through second drive mass 114. First sense mass 122 is suspended above surface 123 of substrate 119 and is connected to first drive mass 112 with flexible support elements 130. Second sense mass 126 is suspended above surface 123 of substrate 119 and is connected to second drive mass 114 with flexible support elements 132.

Angular rate sensor 110 further includes an electrode structure coupled to first and second drive masses 112 and 114, respectively, and suspended apart from substrate 119. In an embodiment, the electrode structure includes first sense electrodes and second sense electrodes. The first sense electrodes, referred to herein as first finger electrodes 134 (illustrated using rightwardly and downwardly directed wide hatching) are suspended apart from substrate 119. The second sense electrodes, referred to herein as second finger electrodes 136 (illustrated using rightwardly and upwardly directed wide hatching) are also suspended apart from substrate 119. In an embodiment, some of first and second finger electrodes 134 and 136, respectively, are attached to a first edge 138 of first drive mass 112. The remainder of first and second finger electrodes 134 and 136, respectively are attached to a second edge 140 of second drive mass 114.

First sense mass 122 includes laterally spaced apart finger electrodes 142. A pair of first and second finger electrodes 134 and 136 resides between each pair of spaced apart finger electrodes 142. Thus, first and second finger electrodes 134 and 136 are laterally disposed away from a portion of first sense mass 122, i.e., finger electrodes 142. Similarly, second sense mass 126 includes laterally spaced apart finger electrodes 144. A pair of first and second finger electrodes 134 and 136 resides between each pair of spaced apart finger electrodes 144. Thus, first and second finger electrodes 134 and 136 are also laterally disposed away from a portion of second sense mass 126, i.e., finger electrodes 144. A lengthwise dimension of first and second finger electrodes 134 and 136, respectively, as well as finger electrodes 142 and 144 is longitudinally aligned with, i.e., parallel to, the drive axis, which in this embodiment is X-axis 46. Thus, X-axis 46 is referred to in connection with angular rate sensor 110 as drive axis 46.

In accordance with an embodiment, angular rate sensor 110 includes a first interconnect 146 electrically coupling first finger electrodes 134 that are attached to first drive mass 112, and a second interconnect 148 electrically coupling second finger electrodes 136 that are attached to first drive mass 112. Likewise, angular rate sensor 110 includes a third interconnect 150 electrically coupling first finger electrodes 134 that are attached to second drive mass 114, and a fourth interconnect 150 electrically coupling second finger electrodes 136 that are attached to second drive mass 114. Interconnects 146, 148, 150, and 152 are obscured by first and second drive masses 112 and 114 in FIG. 4. Therefore, interconnects 146, 148, 150, and 152 are represented by dashed lines in FIG. 4, and their electrical interconnections with first and second finger electrodes 134, 136, respectively, are represented by black squares. However, in the cross-sectional side view diagram of FIG. 5, first interconnect 146 is visible underlying first drive mass 112 and is electrically interconnected with first drive fingers 134.

First finger electrodes 134 are electrically isolated from second finger electrodes 136. Likewise, first and second interconnects 146, 148 underlying first drive mass 112 are electrically isolated from one another, and third and fourth interconnects 150, 152 underlying second drive mass 114 are electrically isolated from one another. Additionally, first and second finger electrodes 134, 136 are electrically isolated from first and second drive masses 112, 114. This electrical isolation may be accomplished by a trench isolation fabrication technique in which an electrically insulating material 154 is deposited through an entire thickness of first and second drive masses 112, 114 around those portions of first and second finger electrodes 134, 136 that extend into first and second drive masses 112, 114.

In the illustrated embodiment, a positive output terminal 156 (labeled "SMU+") is coupled with first finger electrodes 134 by way of conductive spring elements 158. Likewise, a negative output terminal 160 (labeled "SMU−") is coupled with second finger electrodes 136 by way of conductive spring elements 162. Thus, first finger electrodes 134 may be considered a positive sense pole of angular rate sensor 110, and second finger electrodes 136 may be considered a negative sense pole of angular rate sensor 110.

With particular reference to FIG. 5, substrate 119 may be suitably formed to include a first oxide layer 164 and a second oxide layer 166. Process operations performed to create a second substrate 168, i.e., a second wafer, entail oxide deposition and via etch to form an insulating oxide layer 170 on a silicon base layer 172, polysilicon deposition and patterning over oxide layer 170 to form a polysilicon layer 174 that includes interconnects 146, 148, 150, and 152, and so forth. Further process operations entail oxide deposition, chemical mechanical planarization, and oxide patterning to form another insulating oxide layer 176 overlying polysilicon layer 174. Second substrate 168 may then be bonded to substrate 119. Following bonding, interconnects 146, 148, 150, and 152 are thus interposed between substrate 119 and oxide layer 170 of second substrate 168.

Further process steps may entail fabrication operations performed on second substrate 168 including, for example, etch and fill operations to form conductive filled vias 178 that will eventually electrically couple the underlying interconnects 146, 148, 150, and 152 with their respective first and second finger electrodes 134 and 136, and etching to form first and second drive masses 112, 114, first and second sense masses 122, 126, first and second finger electrodes 134, 136, and their interconnecting springs and anchors (discussed above). The space around first and second finger electrodes 134, 136 formed during the etch operation can then be filled with insulating material 154, i.e., a dielectric such as nitride, according to a trench isolation technique. An oxide time etch can then be performed to remove a portion of oxide layers 164, 176, and 170. The space created by etching oxide layers 164, 176, and 170 results in first and second drive masses 112, 114, first and second sense masses 122 and 126, first and second finger electrodes 134, 136, and interconnects 146, 148, 150, and 152 being suspended above surface 123 of substrate 119.

With particular reference to FIG. 4, in order to operate angular rate sensor 110, a drive system (not shown for simplicity of illustration) in communication with first and second drive masses 112 and 114, enables mechanical linear oscillation of drive masses 112 and 114, as represented by oppositely pointing arrows 180, within a plane parallel to surface 123 of substrate 119. Thus, first and second drive masses 112 and 114 linearly oscillate along drive axis 46. First and second drive masses 112 and 114 are suitably linked together and/or otherwise suitably driven to move in opposite directions, i.e., antiphase, along drive axis 46. First sense mass 122 linearly oscillates along drive axis 46 together with first drive mass 112 due to the high stiffness of flexible support elements 130 to this motion. Likewise, second sense mass 126 linearly oscillates along drive axis 46 together with second drive mass 114 due to the high stiffness of flexible support elements 132 to this motion. Thus, first and second drive masses 112 and 114 move in opposite directions relative to one another, i.e., antiphase, along drive axis 46.

Once first and second sense masses 122 and 126 are put into linear oscillatory motion along drive axis 46, angular rate sensor 110 is capable of detecting an angular rate, i.e., angular velocity, induced by angular rate sensor 110 being rotated about an axis of rotation, referred to herein as an input axis. In this example, the input axis is Z-axis 96 perpendicular to surface 123 of substrate 119. Thus, Z-axis 96 is referred to in connection with angular rate sensor 110 as an input axis 96. As angular rate sensor 110 experiences an angular velocity about input axis 96, first and second sense masses 122 and 126 are put into linear oscillatory motion along a third axis, referred to herein as the sense axis. In this example, the sense axis is Y-axis 98. Therefore, Y-axis 98 is referred to in connection with angular rate sensor 110 as a sense axis 98. In particular, a Coriolis acceleration occurs along sense axis 98, which is perpendicular to both drive axis 46 and input axis 96. The Coriolis acceleration results in substantially linear sense motion, as represented by arrows 182, of first and second sense masses 122 and 126 along sense axis 98, where sense motion 182 has an amplitude that is proportional to the angular rotation rate of sensor 110 about input axis 96.

It should be readily observed in FIG. 4 that when first sense mass 122 oscillates along sense axis 98 relative to first drive mass 112, the width of the gaps between finger electrodes 142 and each of first and second finger electrodes 134 and 136 attached to first drive mass 112 change. Concurrently, the width of the gaps between finger electrodes 144 and each of first and second finger electrodes 134 and 136 attached to second drive mass 114 change. Thus, as first and second sense masses 122 and 126 undergo the linear oscillatory motion along sense axis 98, the position change (i.e., changes in gap width) is sensed as changes in capacitance by first and second finger electrodes 134 and 136. The change in capacitance sensed at first and second electrodes 134 and 136 is processed electronically in the conventional manner to obtain the angular rate of angular rate sensor 110 about input axis 96.

It will be recalled that first drive mass 112 together with first sense mass 122 may linearly oscillate along sense axis 98 in response to quadrature error. Likewise, second drive mass 114 together with second sense mass 126 may also linearly oscillate along sense axis 98 in response to quadrature error. This motion of both drive masses 112 and 114 and sense masses 122 and 126 due to quadrature error is represented by oppositely pointing arrows 184. If left uncompensated, this quadrature error can produce signal error components. However, since first and second finger electrodes 134 and 136 are attached to first and second drive masses 112 and 114, first and second finger electrodes 134 and 136 move together with both drive masses 112 and 114 and sense masses 122 and 126 in response to motion 184 due to quadrature error. Since they are moving together, there is no or little relative motion between sense masses 112 and 114 and first and second finger electrodes 134 and 136 along sense axis 98 in response to quadrature error so that no, or a significantly reduced, signal error component is output. Therefore, quadrature error is largely eliminated from the sense signals detected at output terminals 156 and 160 so that quadrature error compensation is achieved.

Embodiments described herein comprise microelectromechanical systems (MEMS) devices in the form of angular rate sensors in which a quadrature compensation technique is implemented. In one embodiment, an angular rate sensor includes a substrate, a drive mass flexibly coupled to the substrate, and a sense mass suspended above the substrate and flexibly connected to the drive mass via flexible support elements. An electrode structure is mechanically coupled to the drive mass, but is electrically isolated from the drive mass, and is spaced apart from the substrate. The electrode structure is configured to produce a sense signal that indicates movement of the sense mass relative to the electrode structure.

In accordance with embodiments disclosed herein, sense electrodes are mechanically attached to the drive mass so that the drive mass, sense mass, and sense electrodes will move together relative to the sense axis in response to quadrature motion. Since the sense mass and sense electrodes move together, there is no or little relative motion between the sense masses and the sense electrodes due to quadrature error so that no or a significantly reduced signal error component is output. Therefore, the capacitance output due to quadrature error will be significantly reduced, thus effectively compensating for the quadrature error. Consequently, compensation for quadrature error is accomplished without using electrostatic force.

Although the preferred embodiments of the invention have been illustrated and described in detail, it will be readily apparent to those skilled in the art that various modifications may be made therein without departing from the spirit of the invention or from the scope of the appended claims. For example, the drive mass(es) and/or sense mass(es) can have different shapes, such as circular rings, disks, rectangles, and the like. In addition, the drive mass(es) and sense mass(es) may be arranged differently from that which is shown. For example, one sense mass may be centrally located, another sense mass may form an outer frame structure, and the drive mass may be interposed between the two sense masses. Furthermore, although embodiments discussed herein are single axis designs, the same technique may be applied to multi-axis designs as well. In accordance with the embodiments described herein, such variances in structure will still include quadrature compensation electrodes in association with the drive mass(es) and the reverse polarity coupling of the quadrature compensation electrodes with the sense electrodes. Accordingly, it should be appreciated that the exemplary embodiments are only examples, and are not intended to limit the scope, applicability, or configuration of the invention.

What is claimed is:

1. An angular rate sensor comprising:
   a substrate;
   a drive mass flexibly coupled to said substrate, said drive mass comprising a frame structure having a central opening;
   a sense mass suspended above said substrate and flexibly coupled to said drive mass via flexible support elements, said sense mass residing in said central opening; and
   an electrode structure spaced apart from said substrate, said electrode structure comprising a sense plate fixedly attached to said drive mass at two locations on said frame structure so that said sense plate fully extends across at least a portion of said central opening and is vertically spaced apart from said sense mass, said electrode structure being configured to produce a sense signal that indicates movement of said sense mass relative to said electrode structure, wherein
      said drive mass, said sense mass, and said electrode structure move together with an oscillatory drive motion relative to a drive axis;
      while said drive mass, said sense mass, and said electrode structure move together with said oscillatory drive motion, said flexible support elements enable said sense mass to oscillate relative to a sense axis that is perpendicular to said drive axis in response to an angular velocity about an input axis that is perpendicular to each of said drive and said sense axes, wherein oscillation of said sense mass in response to said angular velocity produces said sense signal between said sense mass and said electrode structure; and
      said drive mass, said sense mass, and said electrode structure move together along said sense axis in response to quadrature error thereby resulting in substantially no relative motion between said sense mass and said electrode structure to reduce imposition of a signal error component from said quadrature error on said sense signal.

2. An angular rate sensor as claimed in claim 1 wherein said electrode structure is not in contact with said substrate.

3. An angular rate sensor as claimed in claim 1 wherein said electrode structure is electrically isolated from said drive mass.

4. An angular rate sensor as claimed in claim 1 wherein said electrode structure is interposed between said sense mass and a surface of said substrate.

5. An angular rate sensor as claimed in claim 1 wherein said substrate includes a cavity extending inwardly from a surface of said substrate, said drive mass and said sense mass are suspended above said cavity, and said electrode structure is interposed between said cavity and said drive and sense masses.

6. An angular rate sensor as claimed in claim 1 wherein:
said sense plate is a first sense plate;
said drive mass includes first and second regions separated by an axis of rotation oriented parallel to a surface of said substrate;
said sense mass includes third and fourth regions separated by said axis of rotation, said first and third regions being disposed on a first side of said axis of rotation, and said second and fourth regions being disposed on a second side of said axis of rotation;
said first sense plate is coupled to said first region of said drive mass and extends across said third region of said sense mass; and
said electrode structure further comprises a second sense plate coupled to said second region of said drive mass, said second sense plate extending across said fourth region of said sense mass.

7. An angular rate sensor as claimed in claim 6 wherein said second sense plate is fixedly attached to said second region of said drive mass at two locations on said frame structure so that said second sense plate fully extends across and is vertically spaced apart from said fourth region of said sense mass.

8. An angular rate sensor comprising:
a substrate;
a drive mass flexibly coupled to said substrate, said drive mass comprising a frame structure having a central opening;
a sense mass suspended above said substrate and flexibly coupled to said drive mass via flexible support elements, said sense mass residing in said central opening;
an electrode structure spaced apart from said substrate by an open gap, said electrode structure comprising a sense plate fixedly attached to said drive mass at two locations on said frame structure so that said sense plate fully extends across at least a portion of said central opening and is vertically spaced apart from said sense mass, said electrode structure being configured to produce a sense signal that indicates movement of said sense mass relative to said electrode structure; and
wherein said drive mass, said sense mass, and said electrode structure move together relative to the substrate.

* * * * *